United States Patent [19]
Deveau

[11] Patent Number: 5,559,915
[45] Date of Patent: Sep. 24, 1996

[54] APPARATUSES AND METHODS FOR ALIGNING AN OPTICAL FIBER ARRAY WITH AN OPTICAL INTEGRATED CIRCUIT ASSEMBLY

[75] Inventor: George F. Deveau, Cumming, Ga.

[73] Assignee: Lucent Technologies Inc., Murray Hill, N.J.

[21] Appl. No.: 421,274

[22] Filed: Apr. 13, 1995

[51] Int. Cl.$^6$ .................................................. G02B 6/30
[52] U.S. Cl. ............................... 385/49; 385/14; 385/89; 356/338
[58] Field of Search ............................ 385/49, 50, 75, 385/14, 88–94; 356/337, 338, 339, 340, 341, 342, 343, 445, 446, 372

[56] References Cited

U.S. PATENT DOCUMENTS

| | | | |
|---|---|---|---|
| 4,830,456 | 5/1989 | Kakii et al. | 385/75 |
| 5,085,501 | 2/1992 | Sakuma et al. | 356/75 |
| 5,237,434 | 8/1993 | Feldman et al. | 385/14 X |
| 5,352,712 | 10/1994 | Shustack | 522/31 |
| 5,481,629 | 1/1996 | Tabuchi | 385/14 |
| 5,482,585 | 1/1996 | Ota et al. | 385/49 X |

OTHER PUBLICATIONS

Y. Yamada, et al. "Low–Loss and Stable Fiber–To–Waveguide Connection Utilizing UV Curable Adhesive" Aug. 1992, IEEE Phot. Tech. Letters, vol. 4, No. 8, pp. 906–908.

Y. Hibino, et al. "High Reliability Silica–Based PLC 1×8 Splitters on Si" —Electronics Letters Apr. 14, 1994, vol. 30, No. 8, pp. 640–642.

James E. Matthews, III, et al. "Reliability Studies of Single–Mode Optical Branching Devices" Corning Incorporated, Technical Report, Nov. 1991.

*Primary Examiner*—John D. Lee
*Assistant Examiner*—Phan T. H. Palmer

[57] ABSTRACT

This invention relates to apparatuses and methods for aligning optical fibers housed in an optical fiber array with optical waveguides coupled to an optical integrated circuit (OIC) housed in an OIC assembly of a related invention. An apparatus of this invention includes a first micropositioner in which the optical fiber array is mounted, and a second micropositioner in which the OIC assembly is mounted. An adhesive is applied to one or both opposing ends of the optical fiber array and the OIC assembly, and the first and second micropositioners are manipulated to move the optical fiber array end in close proximity to the OIC assembly end so that the adhesive contacts the ends of the optical fiber array and the OIC assembly to form an optical fiber/adhesive/optical waveguide interface. One optical fiber, preferably toward one side of the optical fiber array, is selected and light from a light source, preferably a laser, is generated and supplied to the selected optical fiber. The optical fiber is aligned by manipulating one or both of the first and second micropositioners until the selected optical fiber is aligned with a respective optical waveguide. The alignment of the optical fiber with its respective optical waveguide is accomplished by monitoring the light scattered from the optical fiber/adhesive/optical waveguide interface using a light detector coupled to a lock-in amplifier. The lock-in amplifier receives a signal from the light source indicative of the modulation frequency of the light source, and detects only light of the same modulation frequency scattered from the interface.

13 Claims, 13 Drawing Sheets

APPARATUSES AND METHODS FOR ALIGNING AN OPTICAL FIBER ARRAY WITH AN OPTICAL INTEGRATED CIRCUIT ASSEMBLY

CROSS-REFERENCES TO RELATED APPLICATIONS

This invention is related to U.S. Ser. No. 08/421,105 and filing date Apr. 13, 1995 to George F. DeVeau filed concurrently with this patent application.

BACKGROUND OF THE INVENTION

1. Field of the Invention

The invention described herein is directed to apparatuses and methods for aligning an optical fiber array housing optical fibers, with optical waveguides coupled to an optical integrated circuit (OIC) housed in an OIC assembly.

2. Description of the Related Art

Optical integrated circuits (OICs) are increasingly being used to implement optical devices including 1×N splitters, switches, wave division multiplexers (WDMs), and other optical devices, primarily due to the capability through optical device integration to obtain devices requiring relatively precise component configurations. Also, OICs generally have a more compact size and are more reliable and durable relative to discrein optical devices.

Often, an OIC is used in conjunction with optical fibers external to the OIC, that transmit optical signals to, and receive optical signals from, the OIC. Therefore, an interconnection needs to be established between the optical fibers and corresponding optical waveguides of the OIC. One technique used to couple optical fibers to optical waveguides of an OIC uses an OIC formed from silica ($SiO_2$) with optical waveguides driven into the OIC using ion implantation (see *"Reliability Studies of Single-Mode Optical Branching Devices"*, J. E. Matthews, III, et al., Corning Inc., November 1991). At an edge, the OIC has a step face extending from a top surface of the silica substrate transversely across the optical waveguides to a depth in the silica substrate. The OIC also has a ledge surface extending along a plane parallel to the top surface of the OIC that meets with the step face. In the step's face, cross-sections of the optical waveguides are exposed. An end of an optical fiber is aligned relative to a corresponding end of an OIC optical waveguide with micropositioners, and adhered to the corresponding OIC optical waveguide end exposed in the step's face. Also, at a distance away from the end of the optical fiber, the optical fiber is adhered to the ledge's surface. The alignment and adhesion of optical fibers ends to corresponding OIC optical waveguide ends and the ledge is repeated one-by-one until all desired optical fibers have been adhered to corresponding OIC waveguides. Although this technique is meritorious to an extent in that it allows for relatively good optimization of optical signal transmission from an optical fiber to an OIC's optical waveguide, the technique is relatively time-consuming and impractical for mass production because the optical fibers must be adhered one-by-one to the OIC's optical waveguides and the ledge. Further, the connection between optical fiber ends and respective ends of the OIC optical waveguides is relatively fragile and therefore can easily be broken. In addition, the connection between the optical fiber ends and respective OIC optical waveguides is not very durable, particularly in high humidity/temperature environments, because the adhesive loses bonding strength under these conditions which can cause the optical fiber ends to separate from the ends of the optical waveguides.

Another technique used to couple an OIC formed on a silica substrate to optical fibers uses silica-glass frames (see *"Low-Loss and Stable Fiber-to-Waveguide Connection Utilizing UV Curable Adhesive"*, Y. Yamada, et al., I.E.E.E., 1992). Two optical fiber arrays are formed by sandwiching an array of optical fiber ends between respective silica and glass components which together define a frame. To aid in alignment of the fibers, the silica-glass frames include alignment grooves. Similarly, a silica substrate in which a 1×8 splitter is integrated, is sandwiched between silica and glass components which define a frame. A silica-glass frame housing an optical fiber array is positioned to oppose one end of the silica-glass frame housing the 1×8 splitter, and the other silica-glass frame housing the other optical fiber array is positioned to oppose the other end of the silica-glass frame housing the 1×8 splitter. The silica-glass frames are then positioned so that the optical fibers and the 1×8 splitter's optical waveguides are aligned, and the silica-glass frames are adhered together using an ultraviolet-curable adhesive. Although meritorious in some respects, this technique suffers from the significant disadvantage that glass and silica have different thermal coefficients of expansion so that the silica-glass frames, the optical fibers and the silica substrate in which the 1×8 splitter is formed, can develop internal stress or strain when subjected to certain temperatures, particularly temperatures different from those existing when the silica-glass frames are manufactured and assembled together. Therefore, the silica-glass frames, optical fibers and silica substrate can break or come apart under certain temperature conditions.

SUMMARY OF THE INVENTION

The invention described in this document overcomes the disadvantages noted above. A related invention includes an interconnection assembly having an optical integrated circuit (OIC) formed on a substrate preferably made of silicon (Si). Coupled to the OIC are optical waveguides formed on the substrate. A protective plate, preferably borosilicate glass (i.e., pyrex™), is adhered to the substrate with an adhesive, to protect the OIC. Preferably, the adhesive is an ultraviolet (UV) curable adhesive cured by irradiation with UV light. The protective plate and silicon substrate are diced to separate the portion of the silicon substrate including the OIC from the remainder of the silicon substrate. The diced protective plate and silicon substrate with its OIC defines an OIC assembly. One or both ends of the optical waveguides of the OIC exposed by dicing are polished at an angle greater than 6°, and preferably about 12°, relative to a direction normal to the major surfaces of the silicon substrate and the protective plate, to minimize reflection of optical signals at the ends of the optical waveguides. In the end or ends of the OIC assembly, the optical waveguide ends are exposed and have laterally spaced relationship preferably at intervals of 250 microns.

The interconnection assembly of the related invention also includes at least one optical fiber array. The optical fiber array includes two parts used to protect and maintain alignment of the end portions of a plurality of optical fibers. The two parts of the optical fiber array also provide surfaces for gripping the optical fiber array to ease assembly of the interconnection assembly of this invention. In preparation for mounting in an optical fiber array, the ends of a plurality of optical fibers are stripped of protective coverings, if any, using an acid or mechanical stripping, for example. The optical fibers are laterally spaced at predetermined intervals corresponding to the spacing of the OIC optical waveguide ends. An adhesive is applied to a surface of at least one of the two parts. The two parts are joined together from opposite sides of the optical fibers. After the adhesive cures, the optical fibers are fixed in position between the two parts. If UV curable adhesive is used, preferably at least one of the two parts is made of a material transparent to UV light such as borosilicate glass (i.e., pyrex™) so that the adhesive, can be irradiated with UV light. To aid in alignment of the optical fibers before adhering the two parts together, one or both of the two parts can be made of silicon or other suitable material, in which linear alignment grooves can be formed using photo-lithography and/or etching or selective deposition techniques. The alignment grooves are disposed in a laterally spaced, parallel relationship corresponding to the spacing of the ends of the OIC optical waveguides. The end portions of the optical fibers can be positioned in respective alignment grooves to achieve proper alignment and spacing of the optical fibers in the optical fiber array. If both of the two parts are made of silicon, a thermally- or room-temperature-curable adhesive is used to hold the two parts together because silicon is relatively opaque to UV light so that UV curable adhesives cannot be effectively used if the two parts are made of silicon. The end of the optical fiber array exposing the ends of the optical fibers, is then polished at an angle corresponding to the angle of the polished surface of the end of the OIC assembly, specifically, at an angle of at least 6°, and preferably at an angle of about 12°, relative to a direction normal to the major surfaces of the two parts. Importantly, the two parts of the optical fiber array are selected and formed from materials with substantially similar thermal coefficients of expansion, a feature of a related invention which prevents internal stress or strain on the adhesive between the two parts which could cause the adhesive to lose bonding strength particularly when the optical fiber array is subjected to temperatures different than the temperature existing at the time the optical fiber array is assembled.

In accordance with this invention, the OIC assembly and the optical fiber array are joined together using an adhesive, preferably of a UV curable type. Before curing the adhesive, the optical fiber ends of the optical fiber array are aligned with the ends of the optical waveguides of the OIC assembly. To align the optical fiber ends to the ends of the optical waveguides, the optical fiber array and OIC assembly are mounted on respective micropositioners. Preferably, alignment is performed by aligning an optical fiber end to an optical waveguide end at or near one side of the plurality of optical fibers. Alignment is achieved by supplying light to the opposite end of the optical fiber, and manipulating the micropositioner holding the optical fiber array until the light output of the optical waveguide on the OIC is maximized, or more preferably, in accordance with the invention described herein, the light scattered from an optical fiber/adhesive/ optical waveguide interface is minimized. The end of the aligned optical fiber is held in position as the remaining optical fibers are rotated about the axis including the aligned optical fiber and OIC optical waveguide until the light output from the OIC is maximized, or the scattered light from the optical fiber/adhesive/optical waveguide interface is minimized in accordance with this invention, for the majority of the remaining optical fibers. The OIC assembly/ adhesive/optical fiber array interface is then irradiated with UV light to cure the adhesive and fix the optical fiber array to the OIC assembly. Depending upon the OIC type, an optical fiber array can also be adhered to the other end of the OIC assembly in a manner similar to that described above. The OIC assembly and its adhered optical fiber array(s) together define an interconnection assembly.

To protect the interconnection assembly, the enclosures of a related invention use a protective tube with at least one planar inside surface, preferably made from a borosilicate glass such as pyrex™, with a thermal coefficient of expansion substantially similar to the first and second parts of the optical fiber array. In the usual case in which the interconnection assembly has an optical fiber array at each of its ends, adhesive is applied to an exposed surface of each optical fiber array, and the interconnection assembly is inserted into the protective tube by threading the optical fibers of one of the optical fiber arrays through the protective tube until the slack of the optical fibers has been drawn through the protective tube. The interconnection assembly is inserted into the tube so that the surfaces of the optical fiber array with the adhesive applied to their surfaces, make contact with the planar inside surface of the protective tube. Depending upon the nature of the adhesive, the adhesive is allowed or caused to cure by the application of appropriate heat or UV light, for example. A sealant is applied inside each end of the tube to form plugs that enclose and seal the interconnection assembly in the tube. Each sealant plug contacts the optical fibers connected to a respective optical fiber array, but does not make contact with the optical fiber array itself, a feature of this invention that helps to minimize temperature- and/or humidity-related stresses or strains on the interconnection assembly which could cause misalignment of the optical fiber ends relative to the optical waveguide ends.

A first preferred enclosure of a related invention includes strain relief boots formed of a flexible yet resilient substance, through which are threaded respective optical fibers of associated optical fiber arrays. The strain relief boots are slid over respective ends of the protective tube and held in position at the end of the tube due to the elasticity of the strain relief boots which are preferably formed from a polymer material such as polyvinyl chloride (PVC). An overmolding of a plastic material such as PVC is then formed over the protective tube and strain relief boots by, for example, dipping the tube and strain relief boots into molten PVC. When cooled after removal from the molten PVC, the PVC overmolding solidifies and protects the interconnection assembly.

A second preferred enclosure of a related invention uses a protective housing, preferably in the form of a stainless steel tube with an inner surface conforming to the outer surface of the protective tube, that can be threaded over the optical fibers of one of the optical fiber arrays. Adhesive is applied to the protective tube and the housing is slid over the protective tube and positioned. The adhesive is then cured to fix the protective housing to the protective tube. The first preferred enclosure also includes strain relief boots through which are threaded respective optical fibers of associated optical fiber arrays and which slide over respective ends of the protective tube. As previously explained, the strain relief boots prevent their respective optical fibers from being bent to an extreme degree that could damage the optical fibers.

Advantageously, the apparatuses and methods for aligning the ends of the optical fibers housed in an an optical fiber array with the optical waveguide ends of the OIC assembly, provide accurate and stable alignment of the optical fiber ends relative to respective optical waveguide ends. This significant advantage is provided in this invention by monitoring light scattered from the optical fiber/adhesive/optical waveguide interface between the optical fiber array and the OIC assembly. Because light scattered from the optical fiber/adhesive/optical waveguide interface more readily indicates optimum alignment of the optical fiber array relative to the OIC assembly compared to light transmitted through the optical fiber/adhesive/optical waveguide interface, the apparatuses and methods of this invention allow for relatively fast and accurate alignment of the optical fiber array relative to an OIC assembly. Importantly, the apparatuses and methods of this invention allow for relatively fast alignment of optical fiber ends relative to optical waveguide ends by aligning a selected optical fiber to its respective waveguide and using the aligned optical fiber and optical waveguide as a pivot axis about which the optical fiber array is rotated relative to the OIC assembly for alignment of the remaining optical fibers with respective optical waveguides, rather than aligning optical fibers with optical waveguides one-by-one as done in prior art methods. This feature allows for relatively rapid, low-cost mass-production of interconnection assemblies. Further, by using the lock-in amplifier, the apparatus of this invention only monitors light scattered from an optical fiber/adhesive/optical waveguide interface at the wavelength of the laser light, preferably with a wavelength that is not significantly present in room light. Therefore, an operator can perform effective alignment of an optical fiber array with an OIC assembly in a well-lighted room without any adverse impact on measurements of scattered light intensity which indicates the relative alignment between an optical fiber array and an OIC assembly. In addition, the apparatuses and methods of this invention allow for determination of the quality of the optical fiber/adhesive/optical waveguide interface by comparing the intensity of laser light transmitted through an optical fiber/adhesive/optical waveguide interface with the intensity of laser light transmitted to the optical fiber/adhesive/optical waveguide interface so that the interconnection assembly can be labelled with appropriate information so that an operator can readily determine whether the interconnection assembly has a quality sufficient for a particular application.

These together with other objects and advantages, which will become subsequently apparent, reside in the details of construction and operation as more fully hereinafter described and claimed, reference being made to the accompanying drawings, forming a part hereof, wherein like numerals refer to like parts throughout.

BRIEF DESCRIPTION OF THE DRAWINGS

The present invention can be better understood with reference to the following drawings. The drawings are not necessarily to scale, emphasis instead being placed upon clearly illustrating principles of the present invention.

DESCRIPTION OF THE PREFERRED EMBODIMENTS

Figure 1:
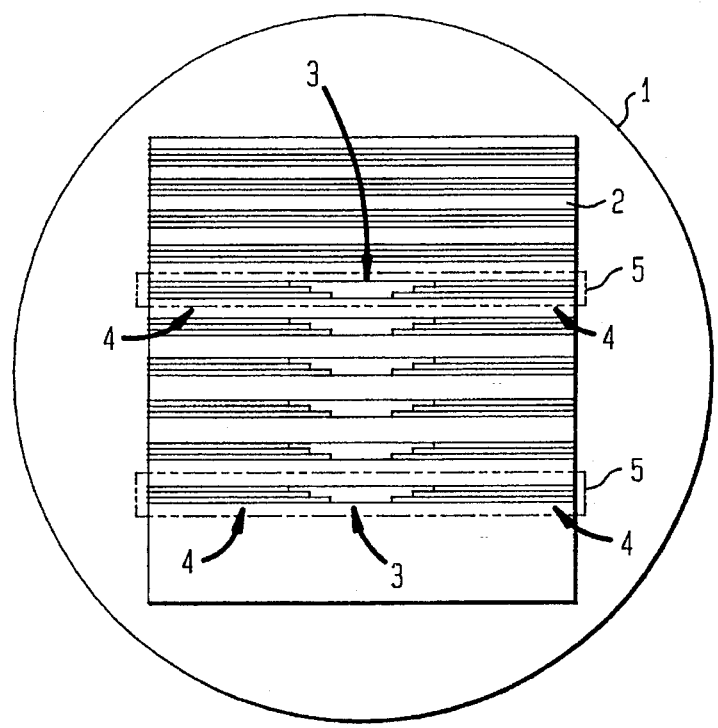
FIG. 1 is a top plan view of a substrate with optical integrated circuits (OICs) of a related invention.

In FIG. 1, a substrate 1, preferably made from silicon, has an optical integrated circuits (OICs) integration area 2 in which are formed a plurality of OICs 3 (only a few of which are specifically indicated in FIG. 1). The OICs 3 have optical waveguides 4 (only a few of which are specifically indicated in FIG. 1) which serve to transmit optical signals to and from respective OICs 3. The OICs 3 and their respective optical waveguides 4 can be separated from the remaining of the silica substrate 1 by dicing along dice lines 5.

Figure 2:
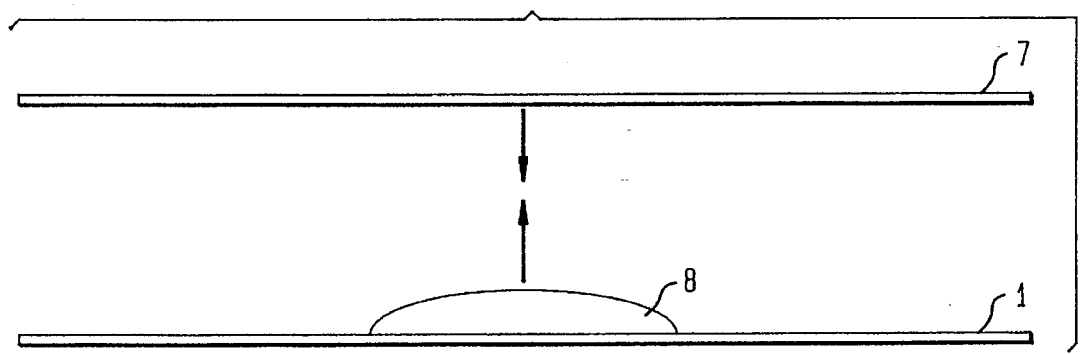
FIG. 2 is a side view of a procedure for adhering a protective plate to the substrate in a related invention.

Preferably, before dicing, a protective plate 7 is adhered to the substrate 1 on the side of the :substrate 1 on which the OICs 3 and their respective waveguides 4 are formed as shown in FIG. 2. Preferably, the protective plate 7 is made of a relatively hard substance to protect the OICs 3 and their respective optical waveguides 4. For example, the protective plate 7 can be a borosilicate glass (i.e., pyrex™) or silicon or other suitable material. Importantly, the protective plate 7 should have a thermal coefficient of expansion substantially similar to the substrate 1. In other words, the difference in thermal coefficients of expansion between the materials composing the substrate 1 and the protective plate 7 should be less than $2 \times 10^{-6}$ cm/cm/°C. and preferably much closer. For example, borosilicate glass has a thermal coefficient of expansion of $3.25 \times 10^{-6}$ cm/cm/°C. whereas silicon has a thermal coefficient of expansion of $3.24\times10^{-6}$ cm/cm/°C. for a difference in thermal coefficient values of about $10\times10^{-9}$ cm/cm/° C. In contrast, the prior art optical fiber array previously described in this document uses silica-glass frames with thermal coefficients of expansion of $0.55\times10^{-6}$ cm/cm/°C. for silica and about $3.25\times10^{-6}$ cm/cm/°C. for glass for a difference in thermal coefficient of expansion values of about $2.7\times10^{-6}$ cm/cm/°C., a relatively large difference in thermal coefficient of expansion values which can destroy adhesive bonds used to form the optical fiber array when the optical fiber array of the prior art device is subjected to temperatures and/or humidity conditions different from those in which the prior art device was fabricated. This invention reduces or eliminates the destruction of adhesive bonds by selecting materials with substantially similar thermal coefficients of expansion to form the substrate 1 and the protective plate 7.

Figure 3:
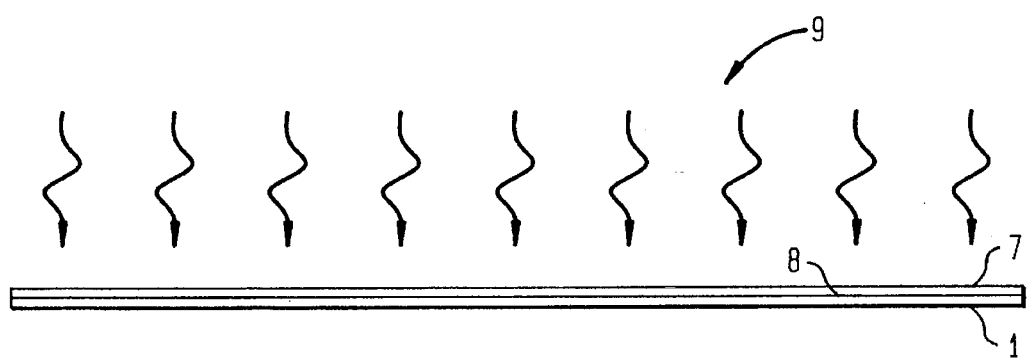
FIG. 3 is a side view of a procedure for curing an ultraviolet-curable adhesive to hold the protective plate and substrate together for a related invention.

As shown in FIG. 2, an adhesive 8 is applied to an opposing surface of either the protective plate 7 of the substrate 1, and the protective plate 7 is joined together with the substrate 1 using the adhesive layer 8 which forms a relatively thin layer when squeezed between the substrate 1 and the protective plate 7 as shown in FIG. 3. Preferably, the adhesive 8 is an ultraviolet (UV)-curable adhesive in which case the protective plate 7 should be made of a material which is transparent to UV light, such as borosilicate glass. In FIG. 3, UV light 9 is generated from a UV light source and passes through the protective plate 7 to irradiate the adhesive 8. The adhesive 8 is thus cured and holds the protective plate 7 and the substrate 1 together. Alternatively, the adhesive 8 can be a thermally- or room-temperature-curable adhesive in which case the protective plate,, 7 can be made of a material which is not transparent to UV light. The substrate 1 and the protective plate 7 are then diced to separate the OICs 3 into separate OIC assemblies.

Figure 4:
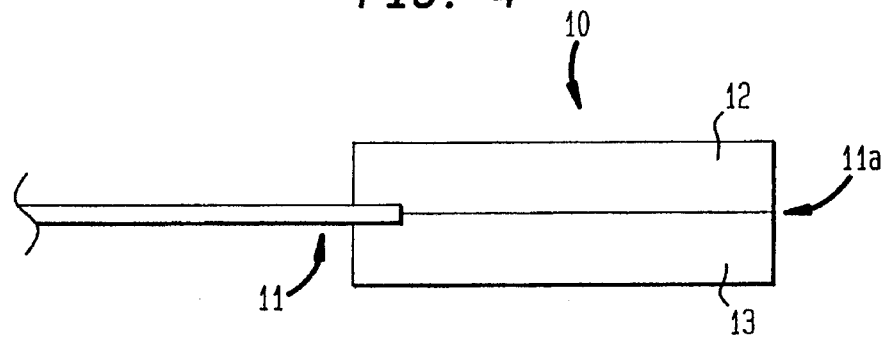
FIG. 4 is a side view of an optical fiber array of a related invention.

To couple the ends of the optical waveguides 4 of an OIC assembly to respective ends of a plurality of optical fibers, the ends of the optical fibers are housed in an optical fiber array 10, as shown in FIG. 4. The optical fiber array 10 receives end portions of a plurality of optical fibers 11. The end portions of the optical fibers 11 are stripped of their protective covers using an acid or mechanical stripping, for example. The end portions of the optical fibers 11 are sandwiched between a first part 12 and a second part 13 preferably held together with an adhesive. Preferably, the opposing surfaces of the first and second parts 12, 13 are stepped at one end of the optical fiber array 10 by grinding or polishing, for example, to receive a portion of the optical fibers 11 with unstripped protective coverings to prevent breakage against the edges of the first and second parts 12, 13 that could otherwise occur if stripped optical fibers 11 against the edges of the first and second parts 12, 13 were coupled to this end of the optical fiber array 10. The ends 11a of the optical fibers 11 are exposed at the other end of the optical fiber array 10 as shown in FIG. 4. Importantly, the first and second parts 12, 13 should be formed from respective materials with substantially similar thermal coefficients of expansion either with the same material or different materials such as silicon and borosilicate glass, which have substantially similar coefficients of expansion, as previously explained with respect to the substrate 1 and the protective plate 7. The use of borosilicate glass for one of the first and second parts 12, 13 allows for UV-curable adhesives to be used because borosilicate glass is transparent to UV light. Because UV-curable adhesives are relatively easy to use because they do not cure until UV light is irradiated on them, the first and second parts 12, 13 can be positioned relative to each other without the UV-curable adhesive setting before proper positioning of the first and second parts 12, 13 is accomplished. Also, alignment grooves can readily be formed in silicon to aid in proper positioning of the optical fibers using photolithography and/or etching or selective deposition techniques. Therefore, the use of borosilicate glass to form one of the first and second parts 12, 13 and the use of silicon to form the other of the first and second parts 12, 13, provides significant advantages relative to prior art optical fiber arrays. In accordance with a related invention, four methods for making an optical fiber array 10 are described below.

Figure 5A:
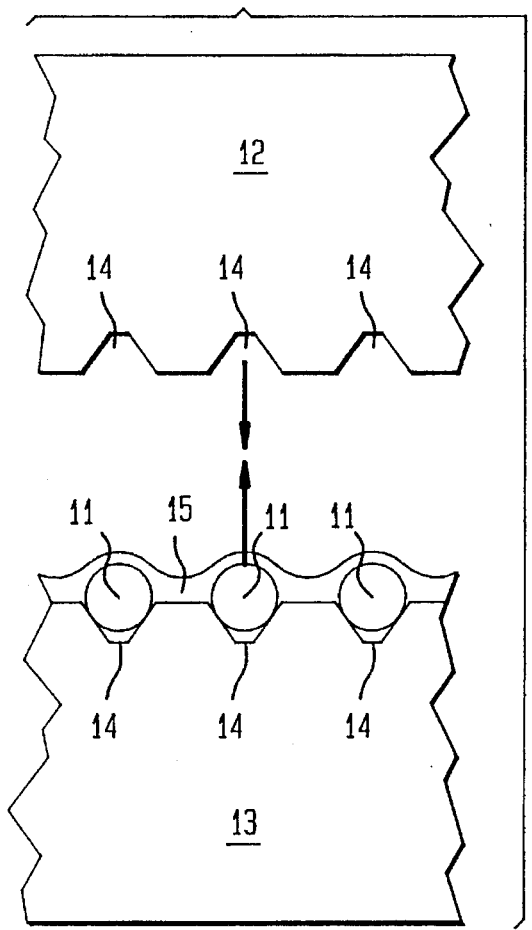
FIGS. 5A–5B are cross-sectional views of a first preferred method for making an optical fiber array in accordance with a related invention.
Figure 5B:
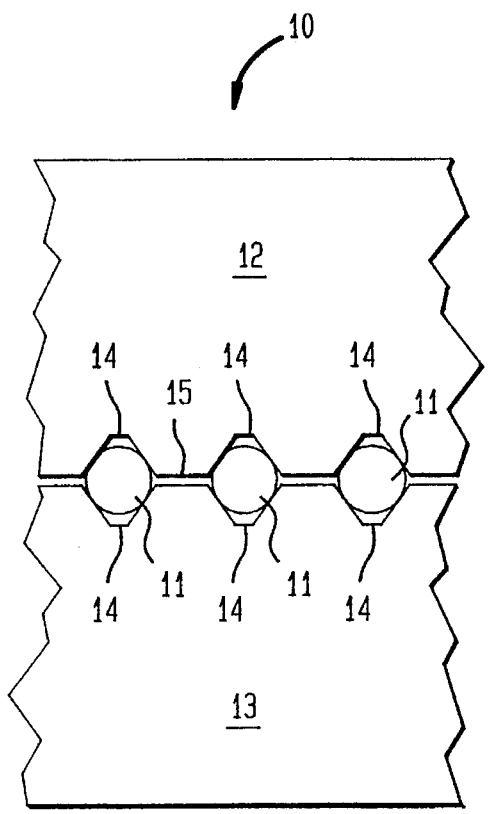

FIGS. 5A and 5B are cross-sectional diagrams of a method for forming an optical fiber array 10. In FIG. 5A, the first and second parts 12, 13 are selected and formed from materials such as silicon, ceramic or borosilicate glass (i.e., pyrex™) which have the same or substantially similar thermal coefficients of expansion. The first and second parts 12, 13 have corresponding spaced, parallel alignment grooves 14, preferably spaced at 250 micron intervals to conform to industry standard optical fiber spacings, which can be readily formed using photolithography and/or etching or selective deposition techniques if the first and second parts 12, 13 are made of silicon. However, the first and second parts 12, 13 can be formed of other materials such as borosilicate glass in which the alignment grooves 14 can be formed by selective deposition of borosilicate glass or by mechanical etching using a diamond scribe, for example. The ends 11a of the optical fibers 11 are exposed at one end of the optical fiber array 10, as shown in FIG. 4. Importantly, the first and second parts 12, 13 should be selected and formed from materials with substantially similar thermal coefficients of expansion either with the same material or different materials such as silicon and borosilicate glass which have substantially similar thermal coefficients of expansion as previously explained with respect to the substrate 1 and the protective plate 7. The first and second parts 12, 13 serve to hold the end portions of the optical fibers 11 in a laterally spaced, parallel relationship. The first and second parts 12, 13 also serve to protect the end portions of the optical fibers 11 and also are preferably sufficiently large to allow the optical fiber array 10 to be gripped either between fingers or in a micropositioner used to align the optical fiber ends 11a with respective ends of the optical waveguides 4 of an OIC 3 housed in an OIC assembly. The optical fiber array 10, and accordingly the first and second parts 12, 13 should be sufficiently large in length and width to allow for a relatively strong adhesive bond to be formed to hold the first and second parts 12, 13 together. The optical fiber array 10, and hence the first and second parts 12, 13, should also be sufficiently wide to house the end portions of the optical fibers 11 spaced at intervals, for example, of 250 microns, and sufficiently large in height so that the end surface of the optical fiber array 10 at which the optical fiber ends 11a are exposed, provides a surface sufficiently large to allow for a relatively strong adhesive bond to be formed when the optical fiber array 10 is adhered to an OIC assembly. For example, the optical fiber array 10 can have a length of about one centimeter, a width of about four millimeters to house twelve optical fibers 11, and a height of from two to four centimeters. In other words, the first and second parts 12, 13 should each be formed to be about one centimeter in length, about four millimeters wide and from one to two milimeters in height. The first and second parts 12, 13 can be formed by grinding, polishing or cutting respective material pieces, or by molding the first and second pieces to conform to these dimensions. Of course, other dimensions for the optical fiber array 10 and/or numbers of optical fibers 11 can be used without departing from the scope of this invention. Preferably, the alignment grooves 14 have angled sides which tend to center the end portions of the optical fibers 11 in the alignment grooves 14. A layer of adhesive 15 is applied to a surface of one of the first and second parts 12, 13 and the end portions of the optical fibers 11 are positioned in respective alignment grooves 14 of one of the first and second parts 12, 13. When the first and second parts 12, 13 are joined together, the end portions of the optical fibers 11 are held between corresponding alignment grooves 14 of the first and second parts 12, 13, and the adhesive 15 contacts the first and second parts 12, 13 and the optical fibers 11. The adhesive 15 is then cured to form the optical fiber array 10 as shown in FIG. 5B. If at least one of the first and second parts 12, 13 is transparent to UV light, the adhesive 15 can be a UV curable adhesive cured by application of UV light. Alternatively, the adhesive 15 can be a thermally-cured or a room-temperature-cured variety of adhesive in which case the adhesive 15 is cured by the application of heat with an appropriate temperature.

Figure 6A:
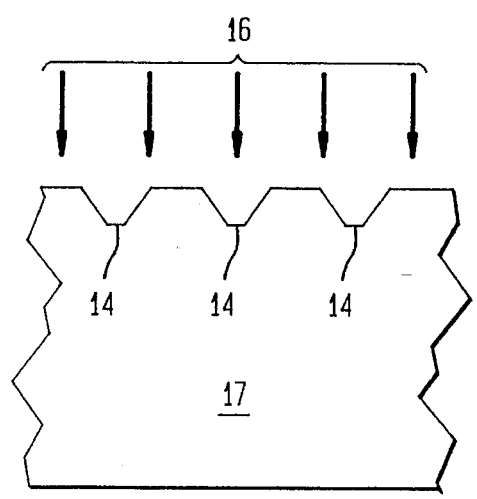
FIGS. 6A–6F are cross-sectional views of a second preferred method for making an optical fiber array in accordance with a related invention.
Figure 6B:
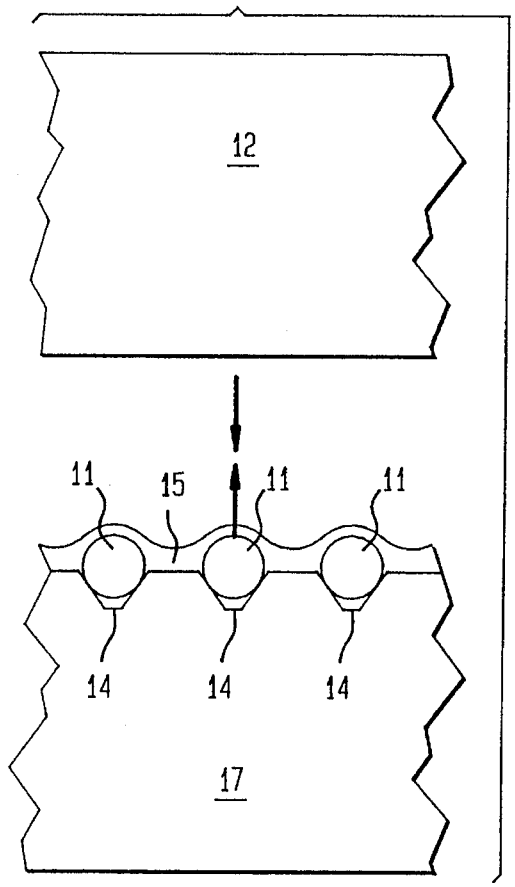
Figure 6D:
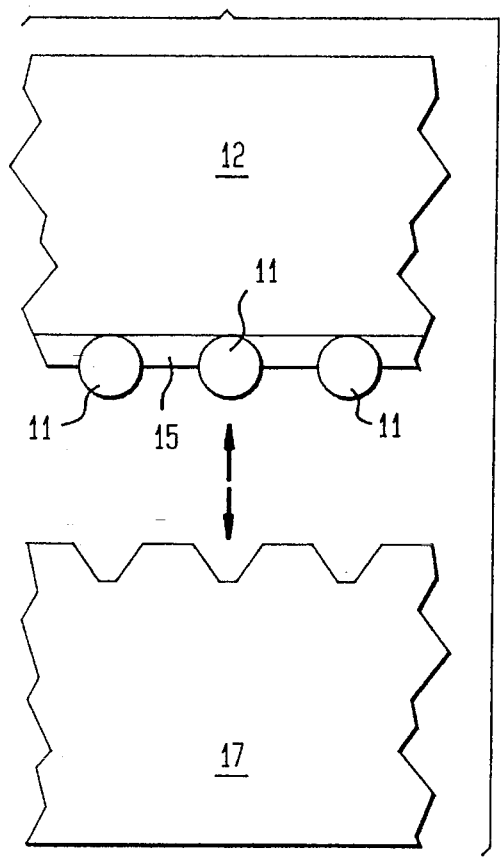
Figure 6C:
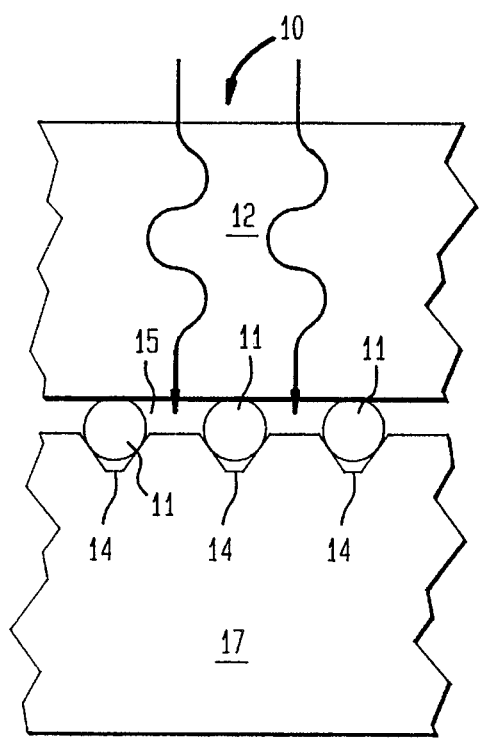
Figure 6E:
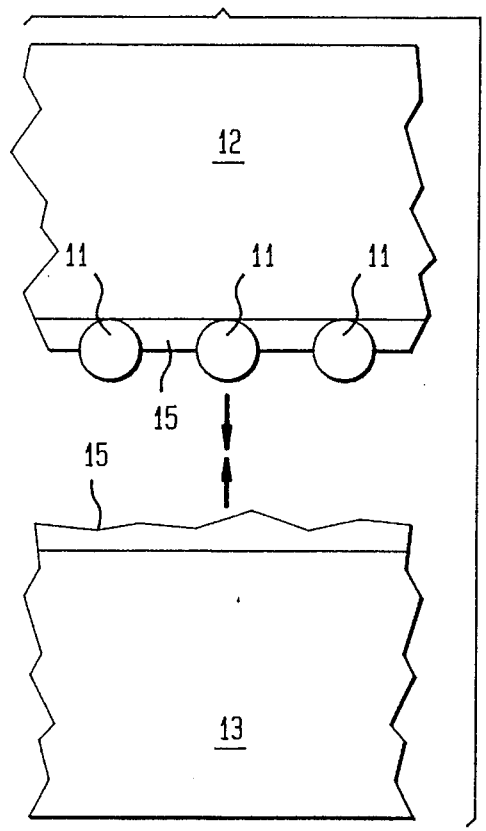
Figure 6F:
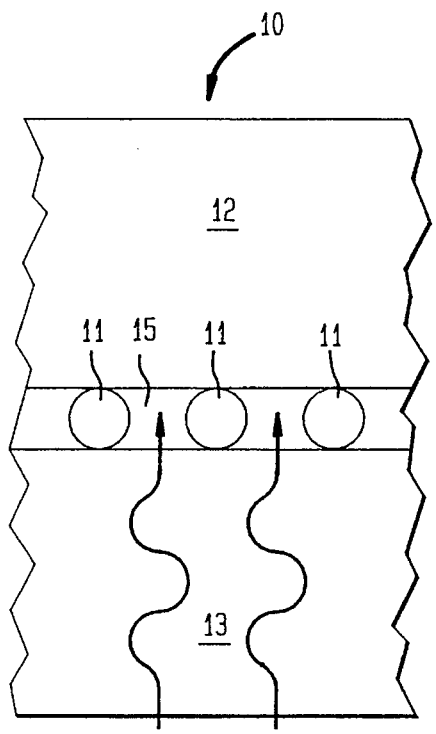

FIGS. 6A–6F are diagrams of a second preferred method of this invention for making an optical fiber array 10. In FIG. 6A, a mold release substance 16 such as Teflon™ is applied to an alignment member 17 for aligning the end portions of the optical fibers 11. The alignment member 17 can be made from ceramic, silicon, glass or other material and has highly precise alignment grooves 14 formed by etching or mechanical cutting of the alignment member 17. An alignment member 17 of a ceramic variety is commercially available from NGK-Locke of Nagoya, Japan. Preferably, the alignment grooves 14 are formed at 250 micron intervals and thus conform to industry-standard spacings of the optical fibers 11. In FIG. 6B, end portions of the optical fibers 11 are positioned in respective alignment grooves 14 and an adhesive layer 15 is applied to the surface of the alignment member 17 and the end portions of the optical fibers 11 as shown in FIG. 6B, or is applied to the opposing surface of the first part 12. The first part 12, preferably formed of a material transparent to UV light such as borosilicate glass, is brought together with the alignment member 17 so that the adhesive 15 is squeezed out to form a relatively thin layer between the alignment member 17 and the first part 12. In FIG. 6C, UV light is generated from a source and passes through the first part 12 to irradiate the adhesive 15. Alternatively, if the alignment member 17 is formed from a material transparent to UV light, the first part 12 need not be made of a material transparent to UV light because the UV light can be irradiated on the adhesive 15 through the alignment member 17 in this case. The irradiation of the adhesive 15 causes the adhesive 15 to cure and hold the end portions of the optical fiber 11 in the spaced, parallel relationship defined by the alignment grooves 14. The end portions of the optical fibers 11 are thus adhered to the first part 12. Alternatively, the adhesive 15 can be of a thermally-cured or room-temperature-cured variety cured by the application of heat with an appropriate temperature in which case the first part 12 and the alignment member 17 can be made of materials that are not transparent to UV light. In FIG. 6D, the first part 12 with attached end portions of the optical fibers 11 is pulled away from the alignment member 17. Due to the application of the mold release substance 16, the adhesive layer 15 and the end portions of the optical fibers 11 do not adhere to the alignment member 17 and thus are readily pulled away and separated from the alignment member 17. In FIG. 6E, the first part 12 is positioned to oppose a surface of the second part 13 to which an uncured adhesive layer 15 is applied. Importantly, the first and second parts 12, 13 are selected to be materials with the same or substantially similar thermal coefficients of expansion for reasons previously explained. The first and second parts 12, 13 can be formed with appropriate dimensions by grinding, polishing or cutting respective larger pieces of materials, or by molding the first and second parts 12, 13 with appropriate dimensions from respective materials. The first and second parts 12, 13 are brought together so that the adhesive 15 and the end portions of the optical fibers 11 attached to the first part 12, make contact with the adhesive 15 applied to the second part 13. Preferably, the second part 13 is made of a substance transparent to UV light. In FIG. 6F, the uncured adhesive 15 is irradiated with UV light generated from a UV light source, to cure the adhesive 15. Alternatively, the second part 13 can be formed of a material opaque to UV light, in which case the UV light can be shined through the first part 12 to cure the adhesive 15. The resulting configuration of the optical fiber array 10 is shown in FIG. 6F.

Figure 7B:
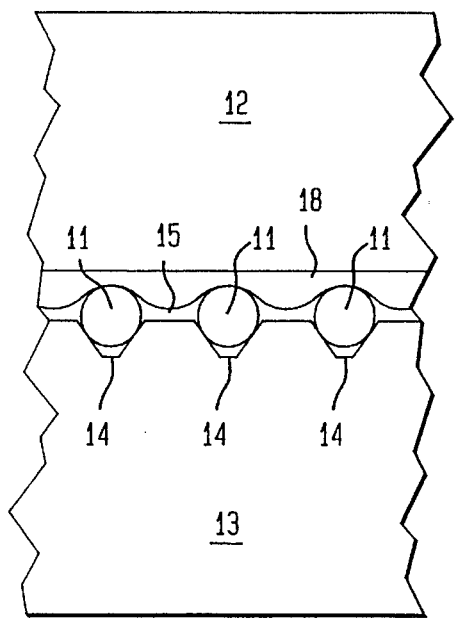
FIGS. 7A–7C are cross-sectional views of a third preferred method for making an optical fiber array in accordance with a related invention.
Figure 7A:
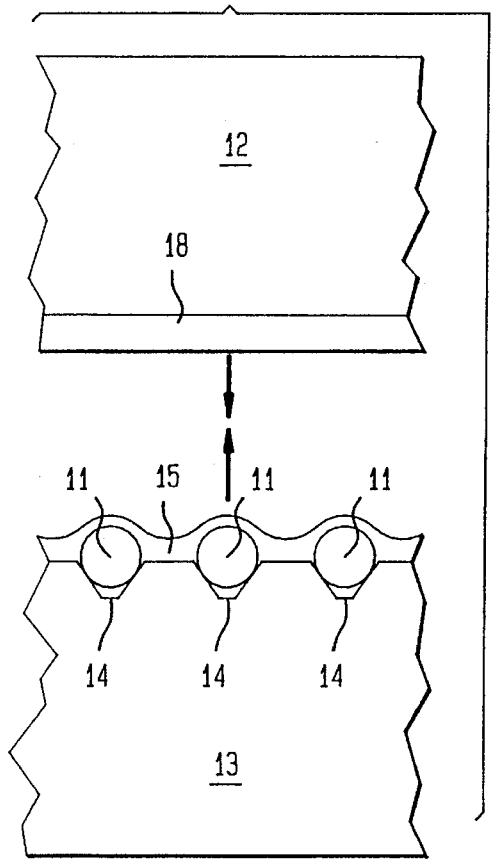
Figure 7C:
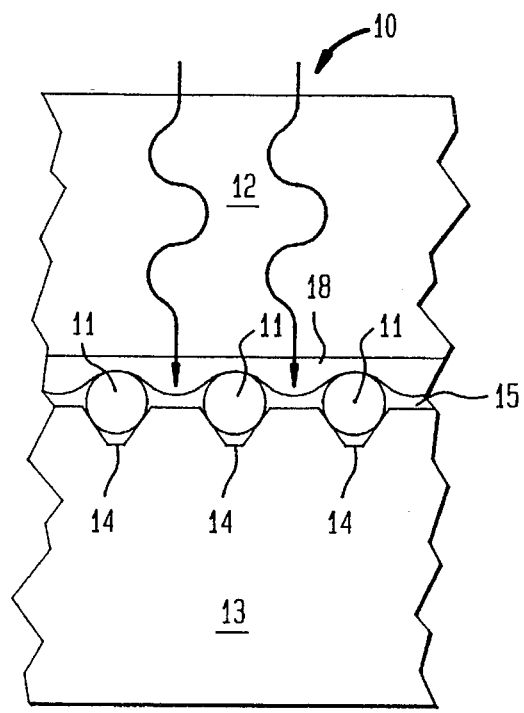

FIGS. 7A through 7C are diagrams of a method for making an optical fiber array 10 in accordance with a third preferred method of a related invention. In FIG. 7A, end portions of the optical fibers 11 are positioned in respective alignment grooves 14 formed on the second part 13. Adhesive 15 is then applied to end portions of the optical fibers 11 and exposed surfaces of the second part 13, or on a compliant layer 18 formed on the first part 12. The first part 12 with the compliant layer 18 is then joined with the second part 13 so that the compliant layer 18 contacts the adhesive 15 and the end portions of the optical fibers 11. The compliant layer 18 can be a relatively thin layer of polymer material such as polyester tape, an ethyl acetate coating or thin-film plasma deposition provided by Polar Materials, Inc. of Martins Creek, Pa. The compliant layer 18 is pliant and thus conforms to the outer surfaces of the end portions of the optical fibers 11. Because the optical fibers 11 often have differing dimensions, the compliant layer 18 conforms to the shape of the end portions of the optical fibers 11, as shown in FIG. 7B, when the first and second parts 12, 13 are brought together. The adhesive 15 thus contacts the compliant layer 18, the end portions of the optical fibers 11 and the second part 13. If the adhesive 15 is a UV curable type, UV light is irradiated from a source to cure the adhesive 15, as shown in FIG. 7C. Preferably, the first part 12 and the compliant layer 18 are transparent to UV light because the alignment grooves are more readily formed by etching, for example, if the second part 13 is made of a material such as silicon which is relatively opaque to UV light. Importantly, the first and second parts 12, 13 are selected and formed from respective materials that have substantially similar thermal coefficients of expansion which reduce stresses and strains upon the adhesive layer 15 when the optical fiber array 10 is subjected to temperatures different from those existing at the time the optical fiber array 10 is manufactured. Therefore, by selecting materials with similar coefficients of expansion to form the first and second parts 12, 13, the bonding strength of the adhesive layer 15 remains relatively strong even if the optical fiber array 10 is subjected to temperatures which vary greatly from those existing when the optical fiber array 10 is manufactured.

Figure 8A:
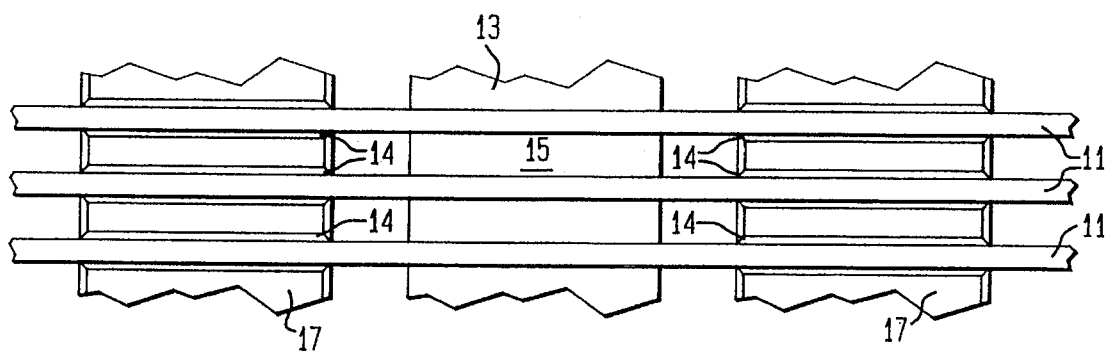
FIGS. 8A–8E are cross-sectional views of a fourth preferred method for making an optical fiber array in accordance with a related invention.
Figure 8B:
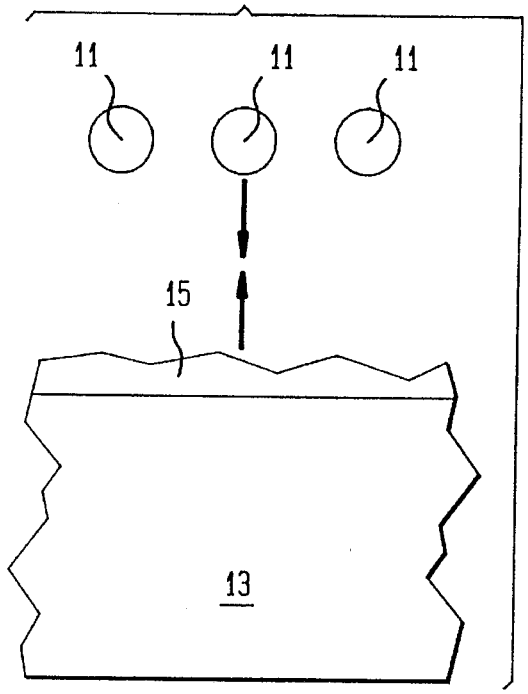

FIGS. 8A–8E are diagrams showing a fourth preferred method for making the optical fiber array 10 in accordance with a related invention. In FIG. 8A, the end portions of optical fibers 11 are positioned in respective spaced, parallel alignment grooves 14 of two spaced alignment members 17. Preferably, the alignment grooves 14 are linear and spaced at 250 micron intervals to conform to industry standard optical fiber spacings. The two alignment members 17 are included in a commercially available part included in the Fujikura FSM20 arc fusion splicer made by Alcoa Fujikura Ltd. of Duncan, S.C., a machine which is used in arc-fusion splicing of optical fibers, a technology which is not relevant to this invention. The alignment members 17 used in the Fujikura FSM20 arc fusion splicer are manufactured by NGK-Locke of Nagoya, Japan. A second part 13 with an adhesive 15 applied to its surface, is positioned between the alignment members 17 at an elevation below the end portions of the optical fibers 11. The second part 13 is brought upwardly in a direction out of the plane of the sheet of FIG. 8A so that the adhesive 15 applied to the surface of the second part 13, contacts the end portions of the optical fibers 11. FIG. 8B is a cross-sectional diagram showing the action of bringing the adhesive 15 on the second part 13, into contact with the end portions of the aligned optical fibers 11.

Figure 8C:
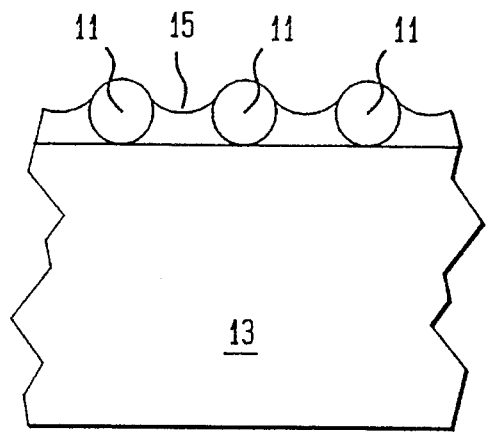

In FIG. 8C, the adhesive 15 is cured so that the optical fibers 11 are held in a spaced, parallel relationship on the surface of the second part 13. If the adhesive 15 is UV-curable adhesive, UV light from a UV light source is irradiated on the adhesive 15. Alternatively, if the adhesive 15 is a room-temperature- or thermally-curable substance, the adhesive 15 is subjected to an appropriate temperature to set the adhesive 15.

Figure 8D:
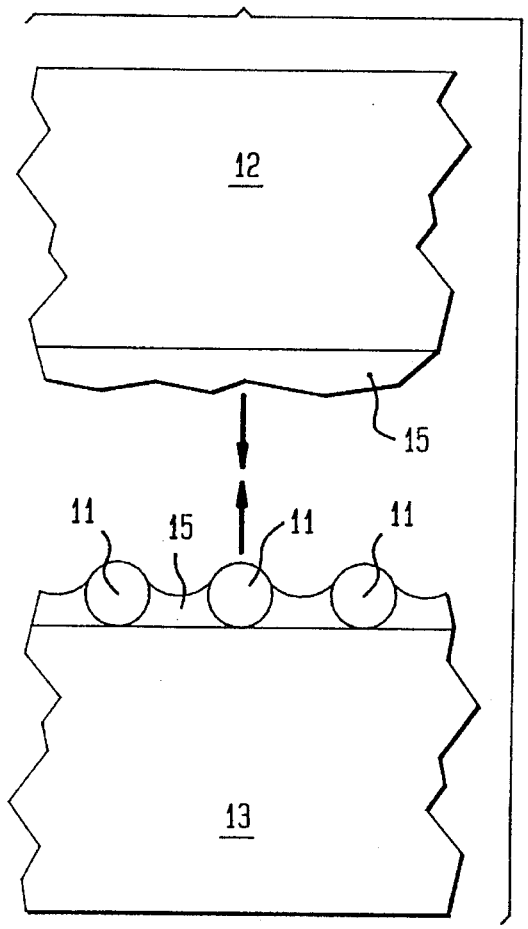

In FIG. 8D, adhesive 15 is applied to a surface of at least one of the first and second parts 12, 13 and the first part 12 is joined together with the second part 13. Significantly, the first and second parts 12, 13 are selected and formed from respective materials that have substantially similar thermal coefficients of expansion either with the same or different materials (such as borosilicate glass and silicon), for reasons previously explained in this document. The uncured portion of the adhesive layer 15 is then cured by the application of UV light or a temperature appropriate to set the adhesive 15, depending upon the type of adhesive 15 used. If a UV curable adhesive 15 is used, at least one of the first and second parts 12, 13 should be of a substance which is transparent to UV light, such as borosilicate glass (i.e., pyrex™).

Figure 8E:
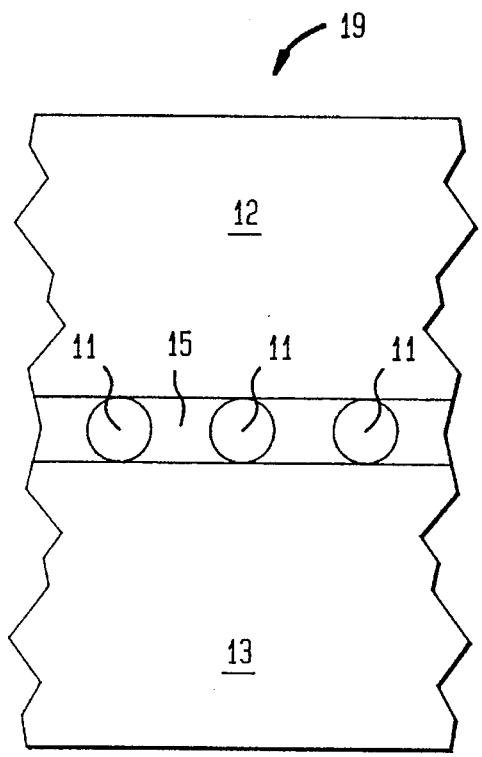

After the; adhesive 15 has been cured, the resulting optical fiber array 10 is as shown in FIG. 8E. If desired, the ends of the optical fibers 11 extending from the optical fiber array 10 can be cut away from the optical fiber array 10 in preparation for polishing the end of the optical array to form optical fiber ends 11a substantially flush with the end face of the optical fiber array 10. Alternatively, the loose ends of the optical fibers 11 can be removed by polishing the end face of the optical fiber array 10.

Figure 9:
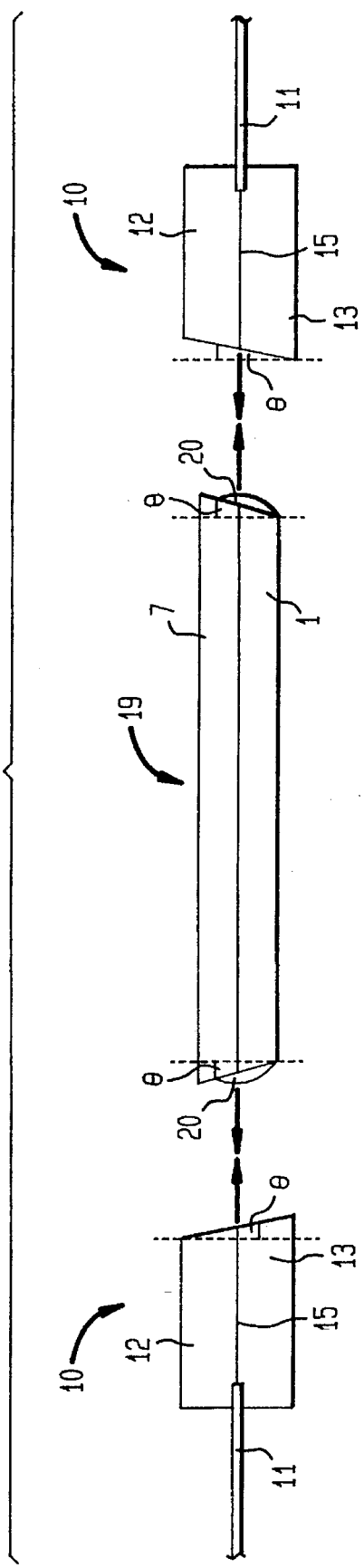
FIG. 9 is a side view of a method for joining optical fiber arrays to respective ends of an OIC assembly in accordance with this invention.

FIG. 9 shows the assembly of an OIC assembly 19 with optical fiber arrays 10 preferably formed according to one of the methods of FIGS. 5A–5B, FIGS. 6A–6F, FIGS. 7A–7C or FIGS. 8A–8E. Preferably, the OIC assembly 19 is formed or polished, for example, so that it has a thickness or height less than the thickness of the optical fiber arrays 10. Although the OIC assembly 19 of FIG. 9 is of a type in which the optical fiber arrays 10 are to be coupled to optical waveguides on opposing sides of the OIC 3 of the OIC assembly 19, a single optical fiber array 10 can be coupled to only one end of the OIC assembly 19, depending upon the nature of the OIC 3. Before joining the OIC assembly 19 with respective optical fiber arrays 10, the ends of the optical fiber assemblies 19 are polished at an angle θ relative to a direction normal to a major surface of the protective plate 7 or the substrate 1. The angle θ is greater than 6°, and preferably about 12°, and serves to minimize reflection of optical signals from the interfaces between the OIC assembly 19 and the optical fiber arrays 10. The ends of the optical fiber arrays 10 are polished at an angle θ corresponding to respective ends of the OIC assembly 19.

An adhesive 20 is then applied to respective ends of one or both of the respective ends of the OIC assembly 19 and the optical fiber arrays 10, and the optical fiber arrays 10 are brought into contact with respective surfaces of the ends of the OIC assembly 19. Importantly, the first and second parts 12, 13 of each optical fiber array 10 are selected so that they have substantially similar thermal coefficients of expansion relative to those of the substrate 1 and the protective plate 17 of the OIC assemblies 19. This feature of this invention prevents significant stresses and strains that would adversely affect the bonding strength of the adhesive 20 from forming when the OIC assembly 19 and the optical fiber arrays 10 are subjected to temperatures and/or humidity conditions different from those under which the OIC assembly 19 and optical fiber arrays 10 are assembled together.

Figure 12:
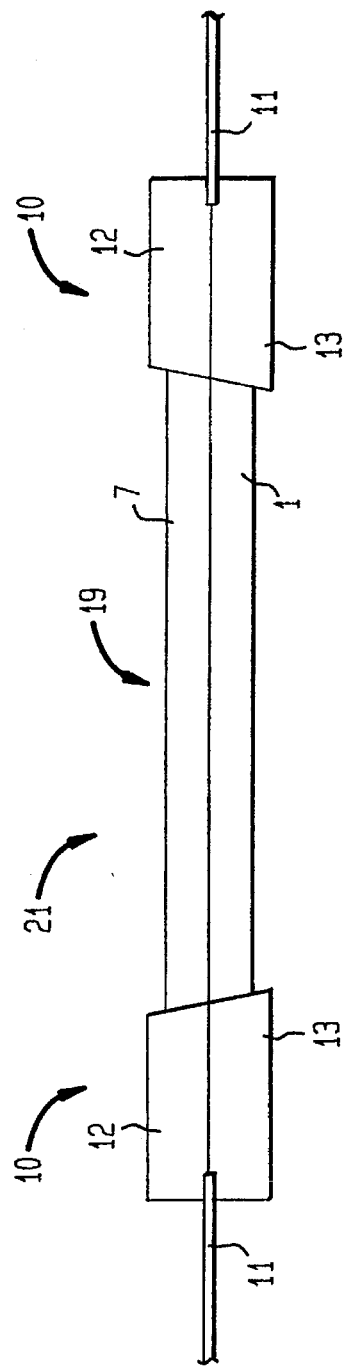
FIG. 12 is a side view of an interconnection assembly including an OIC assembly and two optical fiber arrays of a related invention.
Figure 10:
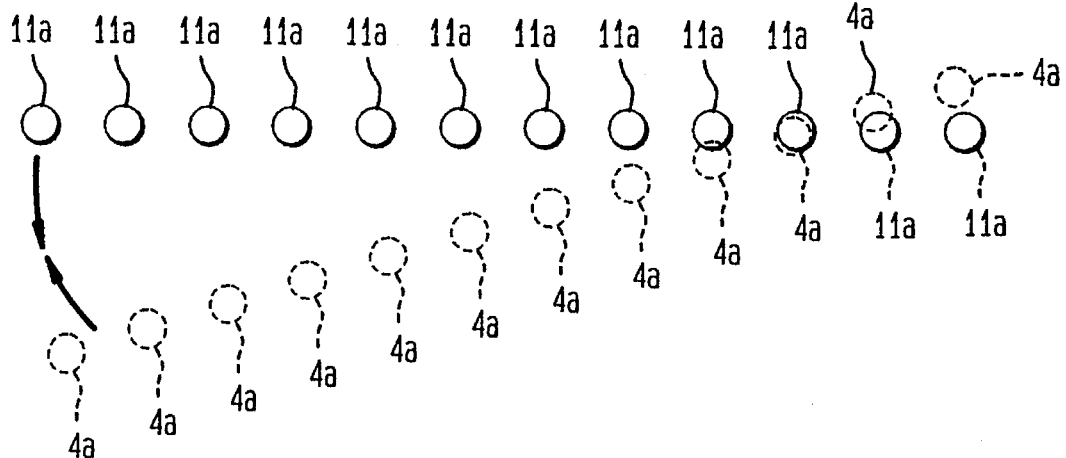
FIG. 10 is a cross-sectional view of a step for aligning optical fiber ends in an optical fiber array to optical waveguides of an OIC assembly in accordance with this invention.
Figure 11:
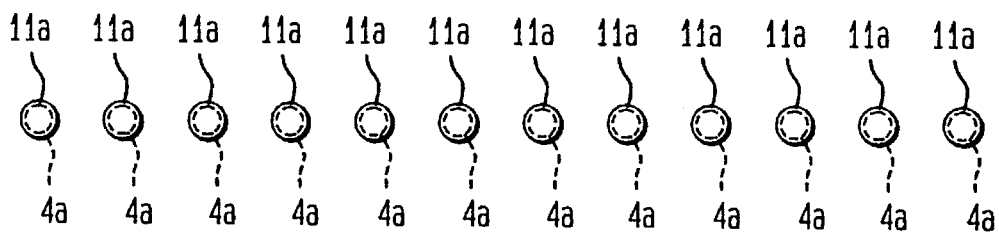
FIG. 11 is a cross-sectional view of the optical fiber ends of the optical fiber array aligned to the optical waveguide ends of the OIC assembly in accordance with this invention.

Preferably, the ends 4a of the optical waveguides 4 coupled to the OIC assembly 19 are aligned with the ends 11a of the optical fibers 11 exposed in the end of the optical fiber array 10, using methods and apparatuses of this invention shown in FIGS. 10–14. The OIC assembly 19 and an optical fiber array 10 are mounted on respective micropositioners. The end of the OIC assembly 19 is then brought into close proximity with the end of the optical fiber array 10 using the micropositioners to form an optical fiber/adhesive/optical waveguide interface in which the adhesive contacts the ends of the optical fiber array 10 and the OIC assembly 19. Light is generated from a source, preferably a laser, and supplied to a selected optical fiber 11 toward one side of the optical fiber array 10. By manipulating the micropositioners, the optical waveguide 4 toward one side of the spaced, parallel optical waveguides 4 coupled to an OIC 3, is aligned with its corresponding optical fiber 11 by monitoring the transmission throughput of the light signal transmitted through the optical fiber end/adhesive/optical waveguide end interface, or more preferably, by monitoring the light scattered from the optical fiber/adhesive/optical waveguide interface in accordance with the methods and apparatuses of this invention. Using the micropositioners, the array of optical fiber ends 11a is rotated relative to the ends 4a of the optical waveguides 4 using the aligned optical fiber end 11a and optical waveguide end 4a as a pivot axis as shown in FIG. 10. When the transmission throughput from the other optical fibers is a maximum or light scattered from the optical fiber/adhesive/optical waveguide interface is a minimum in this invention, the optical fiber ends 11a are aligned with respective optical waveguide ends 4a, as shown in FIG. 11. The adhesive 20 is then cured to fix the ends 4a of the optical waveguides 4 relative to the ends 1 1a of the optical fibers 11. Preferably, the adhesive 20 is UV-curable adhesive which is cured upon application of UV light from a UV light source. Alternatively, the adhesive 20 can be a thermally-cured adhesive in which case the ends 4a of the optical waveguides 4 are fixed relative to the ends 11a of the optical fibers 11 by the application of a temperature suitable to cure the adhesive 20. The procedure described above with respect to FIGS. 10 and 11 is then repeated for the remaining end of the OIC assembly 19 and the end of its respective optical fiber array 10. The resulting interconnection assembly 21 is shown in FIG. 12.

Figure 13:
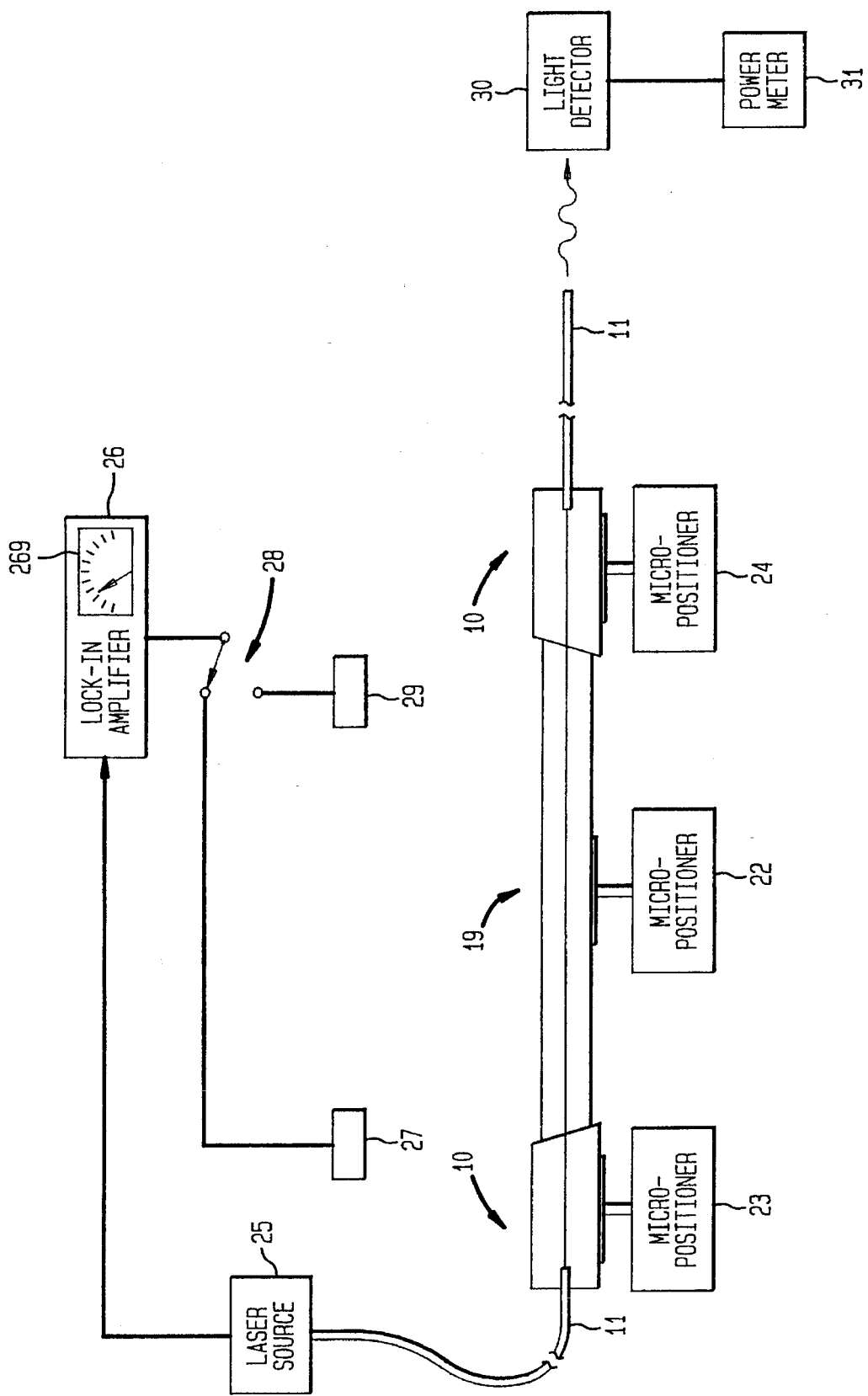
FIG. 13 is a block diagram and side view of an apparatus for aligning the optical waveguide ends of the OIC assembly with the optical fiber ends of the optical fiber arrays in accordance with this invention.

An apparatus of this invention for aligning the optical fibers 11 in the optical fiber arrays 10 to the optical waveguides 4 of the OIC assembly 19, is shown in FIG. 13. Adhesive 20, preferably a UV-curable variety, is applied to one or both ends of the OIC assembly 19 and/or the opposing ends of respective optical fiber arrays 10. In FIG. 13, the OIC assembly 19 and the optical fiber arrays 10 are mounted in respective micropositioners 22, 23 and 24. The micropositioners 22, 23 and 24 can be devices such as those commercially available from Melles-Griot, Inc. of Cambridge, England. Preferably, the micropositioner 22 is a roll-stage capable of rotating about a horizontal axis extending from the left-hand to right-hand side of FIG. 13 or, in other words, an axis parallel with the length of the OIC assembly 19 in FIG. 13. The micropositioners 23, 24 are preferably x-y-z stages capable of finely positioning respective optical fiber arrays 10 in three dimensions. A laser source 25 is coupled to the ends of the optical fibers 11 and can selectively generate laser light in any selected optical fiber 11. The laser source 25 intensity-modulates the laser light at a predetermined frequency and generates an electric signal indicative of the modulation frequency of the laser light. The laser source 25 is coupled to provide the electric signal indicating the modulation frequency of the laser light, to the lock-in amplifier 26. The laser light generated by the laser source 25 passes through a selected optical fiber 11 to the optical fiber/adhesive/optical waveguide interface between the optical fiber array 10 nearest in terms of the optical transmission path to the laser source 25, and the end of the OIC assembly 19 in contact with the optical fiber array 10 nearest to the laser source 25. Laser light scattered from the optical fiber/adhesive/optical waveguide interface is detected by a light detector 27 arranged in proximity to the optical fiber/adhesive/optical waveguide interface, and the light detector 27 generates a signal based on the scattered light. The signal generated by the light detector 27 is supplied to the lock-in amplifier 26 via the switch 28 which is set by an operator to supply the signal generated by the light detector 27 to the lock-in amplifier 26. Preferably, the laser source 25 modulates laser light at a frequency which is not significantly present in room light, for example, at a frequency of 2 kHz. The lock-in amplifier 26 receives the electric signal generated by the laser source 25, and uses this signal to detect only light generated at the modulation frequency of the laser light generated by the laser source 25. Based on the amount of laser light scattered from the optical fiber/adhesive/optical waveguide interface detected by the light detector 27, the lock-in amplifier 26 generates a display 26a indicative of the amount of the scattered light. By manipulating the micropositioner 23 and monitoring the display 26a until the light scattered from the optical fiber/adhesive/optical waveguide interface is a minimum, the selected optical fiber 11 can be aligned with a respective optical waveguide 4. The micropositioner 22 is then manipulated by rotating the roll-stage of the micropositioner 22 about an axis defined by the aligned optical fiber and optical waveguide until the light scattered by the optical fiber/adhesive/optical waveguide interface is a minimum. The switch 28 is then switched to supply the light signal generated by a light detector 29 arranged in proximity to the optical fiber/adhesive/optical waveguide interface furthest from the laser source 25 in terms of optical transmission path, to the lock-in amplifier 26. The signal generated by the light detector 29 is based on the scattered light received from the optical waveguide/adhesive/optical fiber interface farthest from the laser source 25. The alignment method described above is repeated for the optical waveguide/adhesive/optical fiber interface furthest in terms of optical transmission path from the laser source 25. After the optical fiber arrays 10 and the OIC assembly 19 are aligned, the adhesive 20 is irradiated with UV light to cure the adhesive.

A light detector 30 can detect and generate a signal indicative of the intensity of laser light transmitted through the interconnection assembly 21. A power meter 31 coupled to the light detector 30, can be used to determine and display the intensity of the laser light transmitted through the interconnection assembly 21. By comparing the intensity of the laser light generated by the laser source 25 with the intensity of the laser light received at the power meter 31, the quality of the interconnection assembly 21 can be determined and indicated with a label placed on or associated with the interconnection assembly 21 to allow technicians or service persons, for example, to readily determine whether the interconnection assembly 21 is of a quality suitable for a particular application.

An alternative method to align the optical fibers 11 of the optical fiber arrays 10 to the optical waveguides 4 of the OIC assembly 19 (although less preferred method for reasons that will be described with reference to FIG. 15) is described below. Adhesive 20 is applied to the ends of the OIC assembly 19 and/or the ends of the optical fiber arrays 10. The OIC assembly 19 and the optical fiber arrays 10 are mounted in respective micropositioners 22, 23, 24. The optical fiber arrays 10 and the OIC assembly 19 can be aligned by monitoring the laser light intensity transmitted through the interconnection assembly 21. In this case, a light detector 30 is arranged in proximity to the ends of the optical fibers 11 on the opposite side of the interconnection assembly 21 relative to the laser source 25. The micropositioners 22, 23, 24 are manipulated until the power meter 31, coupled to receive the laser light signal from the light detector 30, indicates that the laser light signal generated by and received from the light detector 30, is maximized. After the interconnection assembly 21 is properly aligned, the adhesive 20 is irradiated with UV light to cure the adhesive.

Figure 14:
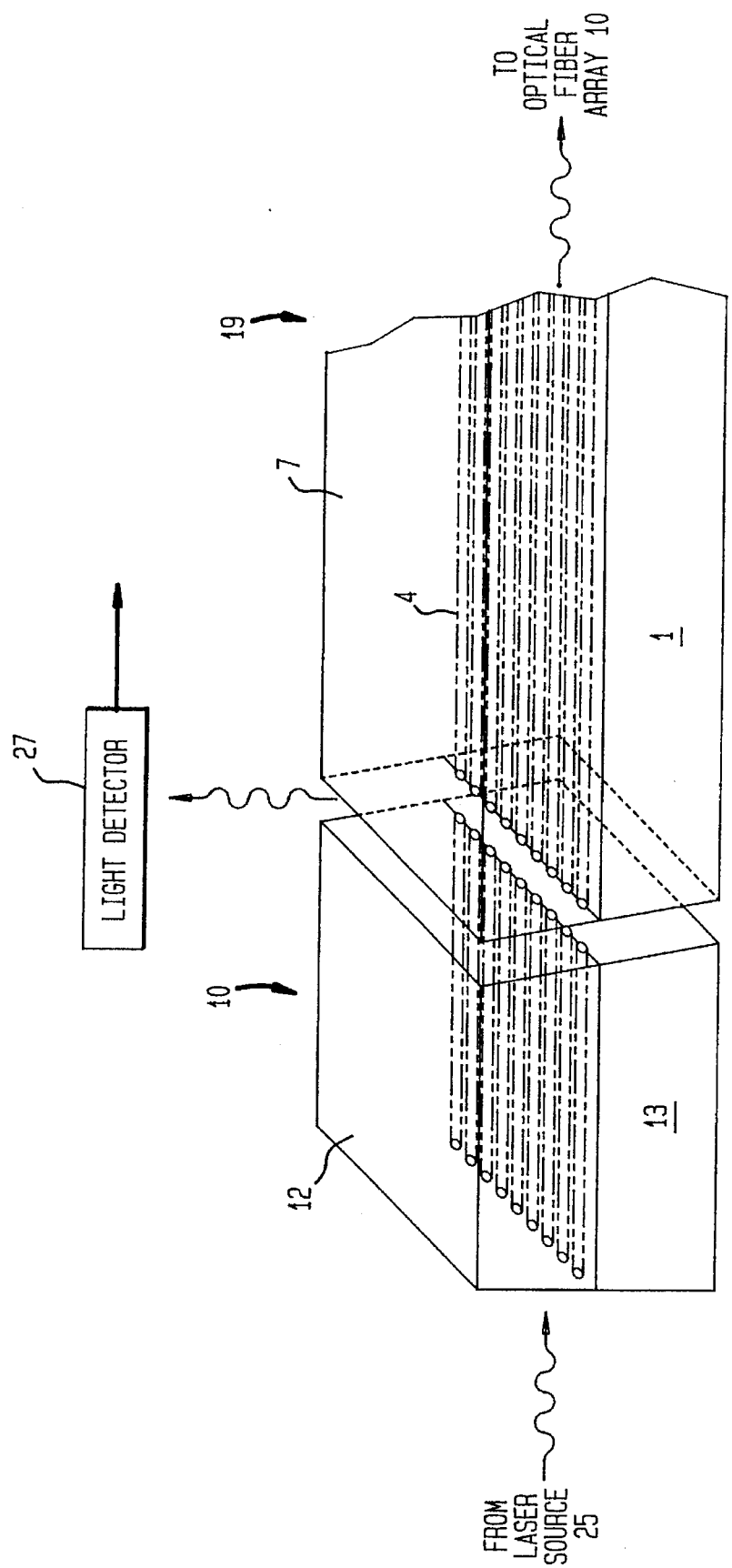
FIG. 14 is a detailed perspective view of an interface between an optical fiber array and an OIC assembly.

FIG. 14 is a relatively detailed perspective diagram of the optical fiber/adhesive/optical waveguide interface nearest to the laser source 25 in FIG. 13. Light supplied to a selected optical fiber 11 from the laser source 25, is scattered at the optical fiber/adhesive/optical waveguide interface between the optical fiber array 10 and the OIC assembly 19. The intensity of the scattered light from the optical fiber/adhesive/optical waveguide interface is a measure of the relative alignment between the selected optical fiber 11 and its respective optical waveguide 4. Part of the scattered light is detected by the light detector 27 that generates a signal based on the scattered light, supplied to the lock-in amplifier 26 via the switch 28. Preferably, the light detector 27 as well as the light detector 29 are relatively large area detectors to detect the scattered light from the optical fiber/optical waveguide interface because the scattered light can propagate in widely varying directions from the interface.

Figure 15:
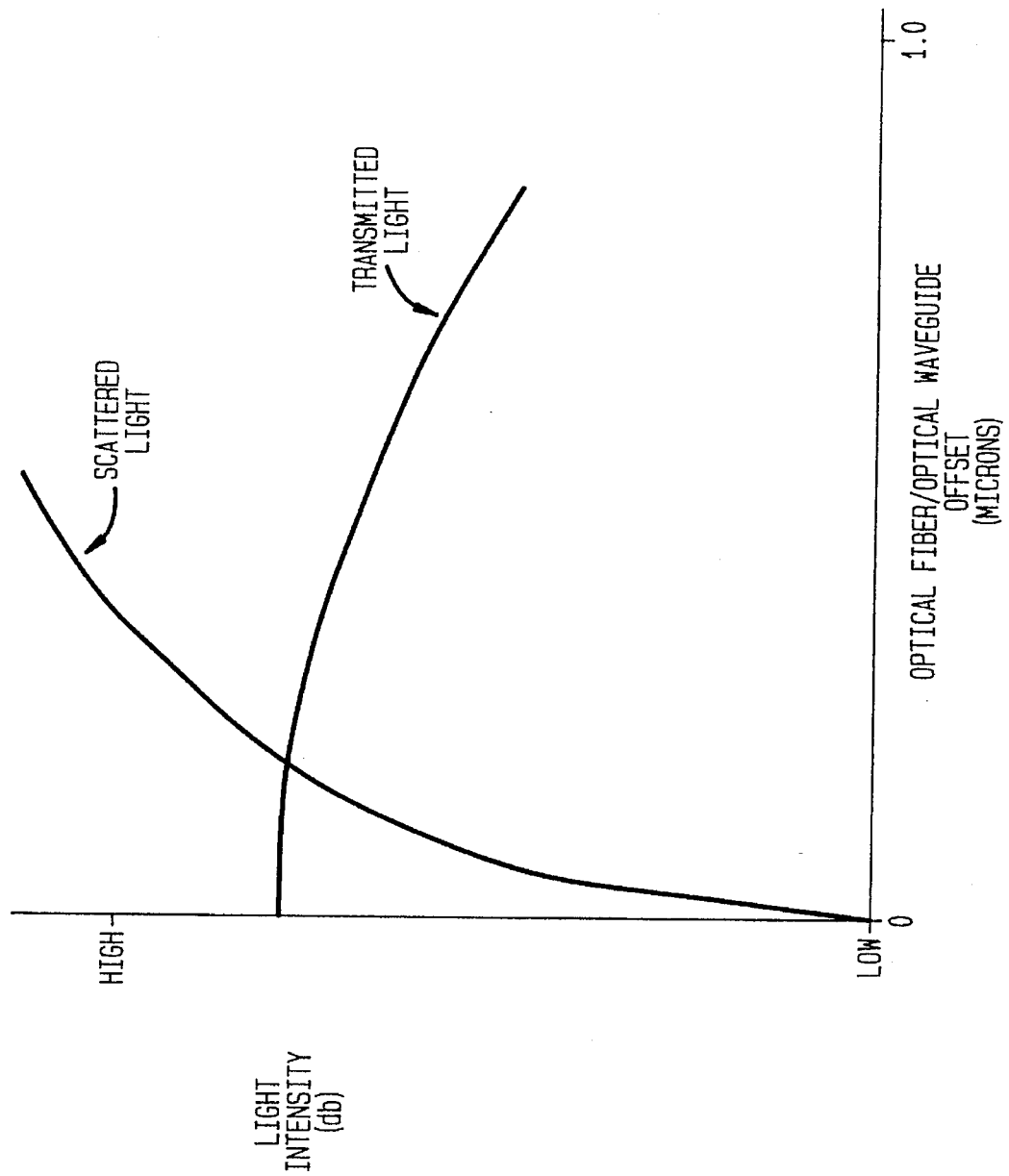
FIG. 15 is a graph of light intensity versus optical fiber/optical waveguide offset for scattered light and transmitted light at an optical fiber/optical waveguide interface in accordance with this invention.

FIG. 15 is a of graph of light intensity in decibels (dB) versus optical fiber/optical fiber offset in microns for typical optical fibers and optical waveguides, for light scattered from an optical fiber/adhesive/optical waveguide interface and light transmitted through the optical fiber/adhesive/optical waveguide interface. As can readily be seen in FIG. 15, the transmitted light has a relatively smoothly-varying light intensity with changes in offset which makes difficult the detection of offset between an optical fiber end 11a and an optical waveguide end 4a. In contrast, the scattered light has a relatively sharply-varying light intensity with increasing offset. Therefore, offsets between an optical fiber end 11a and an optical waveguide end 4a can more readily be detected by using light scattered from an optical fiber/adhesive/optical waveguide interface as opposed to the light transmitted through the optical fiber/adhesive/optical waveguide interface. Therefore, because scattered light provides a better indication of optical fiber alignment relative to optical waveguides than transmitted light, the related invention described in this document uses the scattered light detected by the light detectors 27, 29 of FIG. 13, for example, as opposed to the light transmitted through an optical fiber/adhesive/optical waveguide interface detected by the light detector 30, for example.

Figure 16:
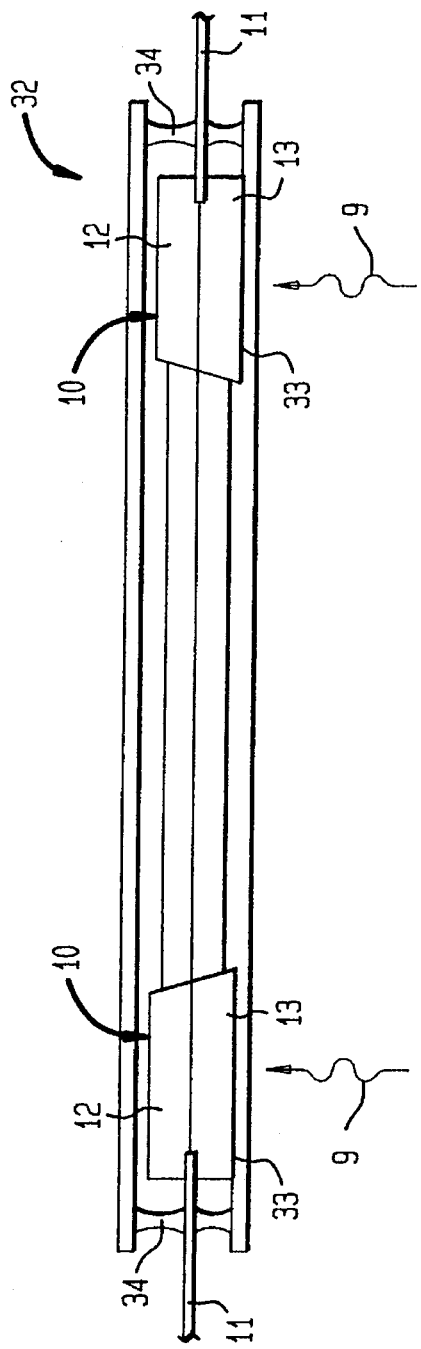
FIG. 16 is a view of an assembly for protecting an interconnection assembly of a related invention.

To protect the interconnection assembly 21 of FIG. 12 from breakage, a protective tube 32 shown in FIG. 16 is used in accordance with this invention. The protective tube 32 includes at least one flat inside surface, and is made from a material with a thermal coefficient of expansion substantially similar to that of the first and second parts 12, 13 of the optical fiber arrays 10. Preferably, the protective tube 32 is formed from a borosilicate glass. An adhesive 33 is applied to surfaces of the optical fiber arrays 10 and the optical fibers 11 of one of the optical fiber arrays 10 are inserted through the protective tube 32. When positioned inside of the protective tube 32, the adhesive-applied surfaces of the optical fiber arrays 10 contact the planar inner surface of the protective tube 32. The adhesive 33 is then cured by the application of UV light 9 in the preferred case in which the adhesive 33 is UV-curable. Alternatively, if the adhesive 33 is a thermally-curable variety, the adhesive 33 is cured by subjecting the adhesive 33 to an appropriate temperature.

The ends of the protective tube 32 are then sealed using sealant plugs 34. The sealant plugs 34 are preferably a silicone sealant substance that is applied inside of each end of the protective tube 32 about respective optical fibers 11. The sealant substance composing the sealant plugs 34 is applied in such a manner that the ends of the protective tube 32 are completely sealed with respective optical fibers 11 extending from the ends of the protective tube 32. However, the sealant plugs 34 do not contact the optical fiber arrays 10 to prevent stresses or strains that could otherwise cause misalignment of the optical fibers relative to the optical waveguides when the assembly of FIG. 16 is subjected to temperatures and/or humidity conditions different from those existing during manufacture of the assembly of FIG. 16.

Figure 17:
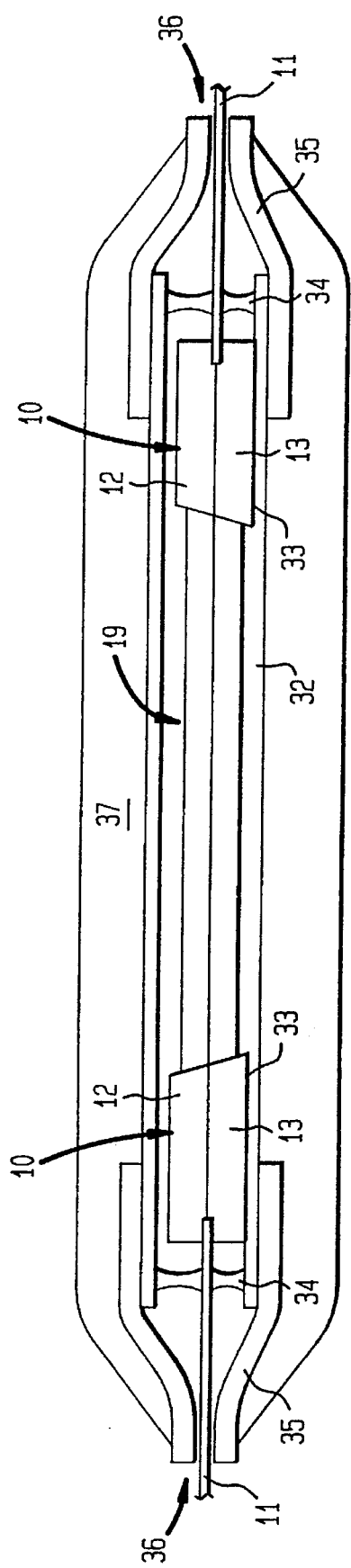
FIG. 17 is a cross-sectional side view of a first preferred enclosure for protecting an interconnection assembly of a related invention.

In accordance with a first preferred enclosure of this invention, in FIG. 17, strain relief boots 35 are threaded over the optical fibers 11 of each end of the assembly of FIG. 16. The strain relief boots 35 are preferably formed from a plastic material such as polyvinyl chloride (PVC) or rubber, and define respective hollow spaces. The strain relief boots 35 are configured to snugly fit over the ends of the protective tube 21 and have a taper which defines a relatively small aperture 25 through which the optical fibers 11 protrude. At the aperture 36, the optical fibers 11 are strictly confined by a respective stress relief boot 35. The stress relief boots 35 serve to prevent the optical fibers 11 from being bent to the point breaking by limiting the freedom of movement of the optical fibers 11. An overmolding 37 is then formed on the protective tube 21. The overmolding 37 can be formed by dipping the protective tube 21 with attached strain relief boots 35 in a molten plastic material and allowing the plastic material to harden.

Figure 18:
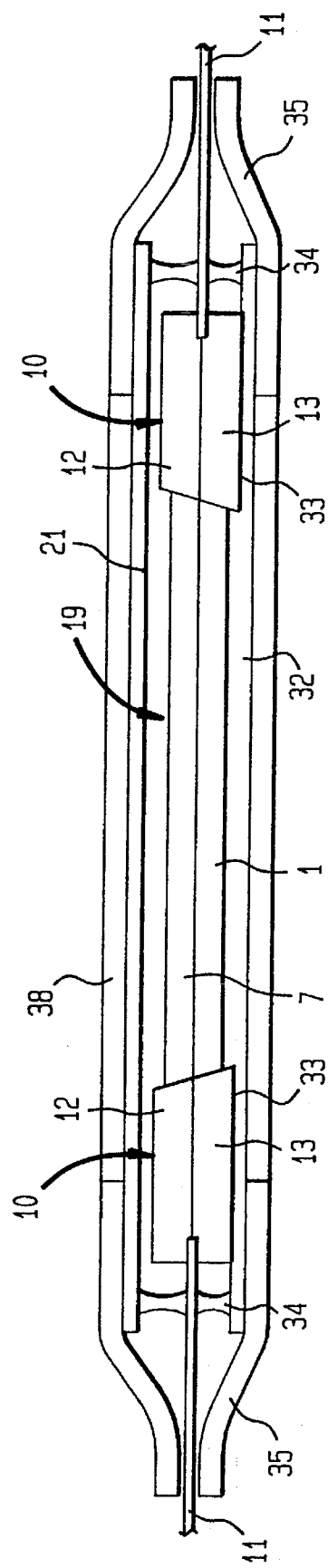
FIG. 18 is a cross-sectional side view of a second preferred enclosure fix protecting the interconnection assembly of a related invention.

FIG. 18 is a second preferred enclosure for the assembly of FIG. 16, in accordance with this invention. In FIG. 18 adhesive is applied to outside surfaces of the protective tube 32. A protective housing 38 with an inner surface conforming to the outer surface of the protective tube 21, is threaded over the optical fibers 11 of one end of the assembly of FIG. 16, and slid over the protective tube 21. The adhesive is then cured to hold the protective tube 32 and the protective housing 38 together. Strain relief boots 24 are then threaded on respective optical fibers 11 and slid over respective ends of the protective tube 21.

In operation, the assemblies of FIG. 17 or FIG. 18 are coupled between predetermined devices, depending upon the type of OIC 3 housed in the assemblies of FIG. 17 or FIG. 18. For example, if the OIC 3 is a WDM, dense wavelength division multiplexer (DWDM) or other multiplexer, or switch, the assemblies of FIG. 17 or FIG. 18 can be coupled in or between optical data transmission switching networks and a telephone, computer or other network, to perform switching of optical signals. If the OIC 3 is a 1×N or N×N splitter or taps, an optical signal separated by the 1×N or N×N splitter or taps can be provided to a monitoring apparatus to monitor the quality of signal transmission on a particular optical fiber or channel carried by the optical fiber, without interrupting the optical signal transmission or can split an optical signal to be provided to several different destinations such as networks, telephones, computers, and/or homes. In addition, the OIC 3 can be a filter to eliminate noise components of an optical signal. Further, the OIC 3 can include a combination of the optical devices mentioned above.

Although the invention has been described with specific illustrations and embodiments, it will be clear to those of ordinary skill in the art that various modifications may be made therein without departing from the spirit and scope of the invention as outlined in the following claims.

We claim:

1. A method comprising the steps of:
   a) mounting an optical fiber array having an end exposing ends of spaced optical fibers housed in the optical fiber array, in a first micropositioner;
   b) mounting an optical integrated circuit (OIC) assembly having an end exposing ends of optical waveguides coupled to an OIC in the OIC assembly in a second micropositioner;
   c) applying an adhesive to at least one of the end of the optical fiber array and the end of the OIC assembly;
   d) manipulating at least one of the first and second micropositioners so that the end of the optical fiber array and the end of the OIC assembly are in close proximity and in contact with the adhesive, to form an optical fiber/adhesive/optical waveguide interface;
   e) selecting an optical fiber for transmission of laser light;
   f) generating and supplying laser light to the optical fiber selected in said step (e);
   g) monitoring laser light scattered from the optical fiber/adhesive/optical waveguide interface;
   h) manipulating at least one of the first and second micropositioners until the scattered light monitored in said step (g) is a minimum; and
   i) curing the adhesive to form an interconnection assembly including the optical fiber array and the OIC assembly.

2. A method as claimed in claim 1, further comprising the steps of:
   after performing said step (h) but before performing said step (i),
   j) manipulating at least one of the first and second micropositioners so that the optical fiber array is rotated relative to the OIC assembly about an axis defined by the optical fiber selected in said step (e);
   k) generating and supplying the laser light to the optical fibers housed in the optical fiber array; and l) repeating said steps (g) and (h).

3. A method as claimed in claim 2, further comprising the step of:

m) determining an intensity of laser light transmitted through the optical fiber/adhesive/optical waveguide interface;

n) determining an intensity of the laser light transmitted to the optical fiber/adhesive/optical waveguide interface;

o) determining a quality of the optical fiber/adhesive/optical waveguide interface based on the intensities determined in said steps (m) and (n); and p) labeling the interconnection assembly with information indicative of the quality of the optical fiber/adhesive/optical waveguide interface determined in said step (o).

4. A method as claimed in claim 1, wherein said step (i) is performed by irradiating the adhesive with ultraviolet (UV) light.

5. A method as claimed in claim 1, further comprising the step of:

g) modulating the laser light at a predetermined frequency, and wherein said step (g) is performed selectively for only light having the predetermined frequency.

6. A method as claimed in claim 1, wherein said step (g) is performed using a light detector having a relatively large detection area.

7. A method as claimed in claim 1, further comprising the step of:

k) modulating the light at a predetermined frequency, and wherein said step (d) is performed selectively for only light having the predetermined frequency.

8. A method comprising the steps of:

a) applying an adhesive to at least one of an end of an optical fiber array exposing ends of spaced optical fibers housed in the optical fiber array, and an end of an optical integrated circuit (OIC) assembly exposing ends of optical waveguides coupled to an OIC in the OIC assembly;

b) positioning the end of the optical fiber array and the end of the OIC assembly so that the end of the optical fiber array and the end of the OIC assembly are in close proximity and in contact with the adhesive, to form an optical fiber/adhesive/optical waveguide interface;

c) generating and supplying light to at least one optical fiber;

d) monitoring the light scattered from the optical fiber/adhesive/optical waveguide interface;

e) positioning the optical fiber array relative to the OIC assembly until the scattered light monitored in said step (d) is a minimum; and f) curing the adhesive applied in said step (a).

9. A method as claimed in claim 8, wherein said step (f) is performed by irradiating the adhesive with ultraviolet (UV) light.

10. A method as claimed in claim 8, (further comprising the step of:

g) determining an intensity of laser light transmitted through the optical fiber/adhesive/optical waveguide interface;

h) determining an intensity of the laser light transmitted to the optical fiber/adhesive/optical waveguide interface;

i) determining a quality of the optical fiber/adhesive/optical waveguide interface based on the intensities determined in said steps (g) and (h); and j) labeling the interconnection assembly with information indicative of the quality of the optical fiber/adhesive/optical waveguide interface determined in said step (i).

11. An apparatus for aligning a first optical fiber array with an optical integrated circuit (OIC) assembly comprising:

a first micropositioner for mounting a first optical fiber array having an end exposing first ends of spaced optical fibers housed in the first optical fiber array;

a second micropositioner for mounting an optical integrated circuit (OIC) assembly having a first end exposing first ends of optical waveguides coupled to an OIC in the OIC assembly;

a laser source coupled to the second ends of the first optical fibers housed in the first optical fiber array, generating and supplying laser light to the optical fibers in the optical fiber array and a signal indicative of a modulation frequency of the laser light;

a first light detector arranged in proximity to a first interface between the end of the first optical fiber array and the end of the OIC assembly, detecting light scattered from the first interface and generating a signal based on the light scattered from the first interface; and a lock-in amplifier coupled to receive the signal from the laser source and the signal from the light detector, and capable of generating a display indicative of an amount of the light scattered from the first interface, based on the signal indicative of the wavelength of the laser light and the signal generated by the first light detector.

12. An apparatus as claimed in claim 11, wherein the apparatus is capable of aligning a second optical fiber array with the OIC assembly, further comprising:

a third micropositioner for mounting the second optical fiber array having an end exposing ends of spaced optical fibers housed in the second optical fiber array;

a second light detector coupled to the lock-in amplifier, arranged in proximity to a second interface between the end of the second optical fiber array and a second end of the OIC assembly, detecting light scattered from the second interface, and generating a signal based on the light scattered from the second interface; and a switch coupled between the first and second light detectors and the lock-in amplifier, for selecting one of the signals from the first and second light detectors, to be output to the lock-in amplifier, the lock-in amplifier capable of generating the display based on the signal indicative of the wavelength of the laser light and the signal supplied by the switch from one of the first and second light detectors.

13. An apparatus as claimed in claim 12, further comprising:

a third light detector arranged to receive laser light transmitted through the first and second interfaces, and generating a signal based on the received laser light; and a power meter coupled to receive the signal from the third light detector, and generating a display based on the signal from the third light detector.

* * * * *